(12) United States Patent
Leng

(10) Patent No.: US 7,995,471 B2
(45) Date of Patent: Aug. 9, 2011

(54) HIGH-PERFORMANCE WIMAX QOS CONDITION SCHEDULING MECHANISM

(75) Inventor: Qiuming Leng, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 11/478,877

(22) Filed: Jun. 30, 2006

(65) Prior Publication Data

US 2008/0002584 A1   Jan. 3, 2008

(51) Int. Cl.
*H04L 12/26* (2006.01)
*H04L 12/28* (2006.01)
*H04L 12/56* (2006.01)
*H04L 12/54* (2006.01)

(52) U.S. Cl. .................... 370/229; 370/412; 370/429
(58) Field of Classification Search .................. None
See application file for complete search history.

(56) References Cited

U.S. PATENT DOCUMENTS

| | | | |
|---|---|---|---|
| 6,856,604 B2 | 2/2005 | Lundby | |
| 2003/0103525 A1* | 6/2003 | Wahl | 370/465 |
| 2003/0179706 A1* | 9/2003 | Goetzinger et al. | 370/231 |
| 2005/0159162 A1* | 7/2005 | Park | 455/450 |
| 2006/0104232 A1* | 5/2006 | Gidwani | 370/328 |
| 2006/0104299 A1* | 5/2006 | Vazquez Castro | 370/412 |
| 2006/0120323 A1* | 6/2006 | Ye et al. | 370/329 |
| 2006/0160533 A1* | 7/2006 | Chou et al. | 455/422.1 |
| 2006/0256723 A1* | 11/2006 | Hellenthal | 370/235 |
| 2007/0019599 A1* | 1/2007 | Park et al. | 370/338 |
| 2007/0133454 A1* | 6/2007 | Ware et al. | 370/328 |
| 2007/0147341 A1* | 6/2007 | Izumikawa et al. | 370/351 |
| 2007/0195787 A1* | 8/2007 | Alnuweiri et al. | 370/395.4 |
| 2008/0008188 A1* | 1/2008 | Buga et al. | 370/395.21 |

OTHER PUBLICATIONS

Supriya Maheshwari, "An Efficient QoS Scheduling Architecture for IEEE 802.16 Wireless MANs", Indian Institute of Technology, 2005.*
H.S. Alavi, M. Mojdeh, and N. Yazdani, "A Quality of Service Architecture for IEEE 802.16 Standards", 2005 Asia-Pacific Conference on Communications, Oct. 2005, pp. 249-253.*
Abhishek Maheshwari, "Implementation and Evaluation of a MAC Scheduling Architecture for IEEE 802.16 WirelessMANs", Indian Institute of Technology Kanpur, May 2006.*
D.H. Cho, J.H. Song, M.S. Kim, and K.J. Han, "An Architecture for Efficient QoS Support in the IEEE 802.16 Broadband Wireless Access Network", Springer-Verlag Berlin Heidelberg, ICN 2005, pp. 358-365.*
G. Chu, D. Wang, S. Mei, "A QoS Architecture for the MAC Protocol of IEEE 802.16 BWA System", Communications, Circuits and Systems and West Sino Expositions, IEEE 2002, entire document.*
Q. Liu, X. Wang, G. Giannakis, "Cross-Layer Scheduler Design with QoS Support for Wireless Access Networks", Proceedings of the 2nd International Conference on Quality of Service in Heterogeneous Wired/Wireless Networks, IEEE 2005, entire document.*
K. Wongthavarawat, A. Ganz, "Packet Scheduling for QoS Support in IEEE 802.16 Broadband Wireless Access Systems", International Journal of Communication Systems, vol. 16, p. 81-96, 2003.*

(Continued)

*Primary Examiner* — Chirag G Shah
*Assistant Examiner* — Suk Jin Kang
(74) *Attorney, Agent, or Firm* — Thorpe North & Western LLP

(57) ABSTRACT

Embodiments of a method and apparatus for a high performance worldwide interoperability for microwave access quality of service condition scheduling mechanism are generally described herein. Other embodiments may be described and claimed.

16 Claims, 3 Drawing Sheets

OTHER PUBLICATIONS

A. Stolyar et al., "Largest Weighted Delay First Scheduling: Large Deviations and Optimality", The Annals of Applied Probability, 2001, vol. 11, No. 1, pp. 1-48.

M. Andrews et al., "Providing Quality of Service over a Shared Wireless Link", IEEE Communications Magazine, Feb. 2001, pp. 150-154.

S. Ramabhadran et al., "Stratified Round Robin: A Low Complexity Packet Scheduler with Bandwidth Fairness and Bounded Delay", SIGCOMM '03, Aug. 25-29, 2003, Karlsruhe, Germany.

A. Khattab et al., "Channel-Quality Dependent Earliest Deadline Due Fair Scheduling Schemes for Wireless..", Int'l Workshop on Modeling Analysis and Simulation of Wireless and Mobile Systems archive, Proceedings of the 7th ACM international symposium on Modeling, analysis and simulation of wireless and mobile systems table. Venice, Italy, Session: Scheduling in wireless networks table of contents. pp. 1-20, Year of Publication: 2004, ISBN:1-58113-953-5.

* cited by examiner

HIGH-PERFORMANCE WIMAX QOS CONDITION SCHEDULING MECHANISM

FIELD OF THE INVENTION

The field of invention relates generally to the field of broadband wireless communications, and in particular, to a network architecture that uses a simplified scheduling algorithm while ensuring quality of service requirements.

BACKGROUND INFORMATION

Wireless broadband standards defined by, for example, by the Institute of Electrical Institute of Electrical and Electronic Engineers (IEEE) such as IEEE 802.16 Worldwide Interoperability for Microwave Access (WiMAX), provide an enhanced platform for the delivery of data, video, and voice with wireless signals between a base station and a subscriber. The WiMAX standard requires a high level of QoS and scheduling support to enable the delivery of wireless traffic in a communications network. But, the standard does not define specific scheduling algorithms, leaving room for flexibility among vendor implementations. Wireless broadband vendors want to reduce their cost while providing the highest quality broadband service to their customers.

The efficiency, throughput, and service quality of a communication system largely depend on the scheduler. Scheduling is a complex and time consuming task performed by a base station. The base station handles many wireless connections with varying QoS requirements such as maximum sustained data rate, minimum reserved data rate, maximum latency, and tolerated jitter in real-time. Existing algorithms use a significant amount of processing time to perform the necessary scheduling tasks while optimizing system throughput and determining QoS requirements. Even if the system is not overloaded, data packets may be dropped by the scheduler because the algorithms can not guarantee QoS while optimizing the system throughput. As a result, WiMAX enabled base stations are necessarily equipped with expensive hardware, including high-end processors. This increases costs for the wireless broadband vendors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods for the scheduling of flows in a wireless system are described herein. In the following description, numerous specific details are set forth in order to provide a thorough understanding of embodiments of the present invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Scheduling is a core process in wireless communications systems. An effective scheduler ensures quality of service (QoS), optimizes a wireless communications system throughput, and operates using a very efficient algorithm. An efficient scheduling algorithm may be used to perform a series of scheduling tasks in real-time, providing a required QoS for one or more subscribers while optimizing available resources and minimizing costs for a service provider.

Figure 1:
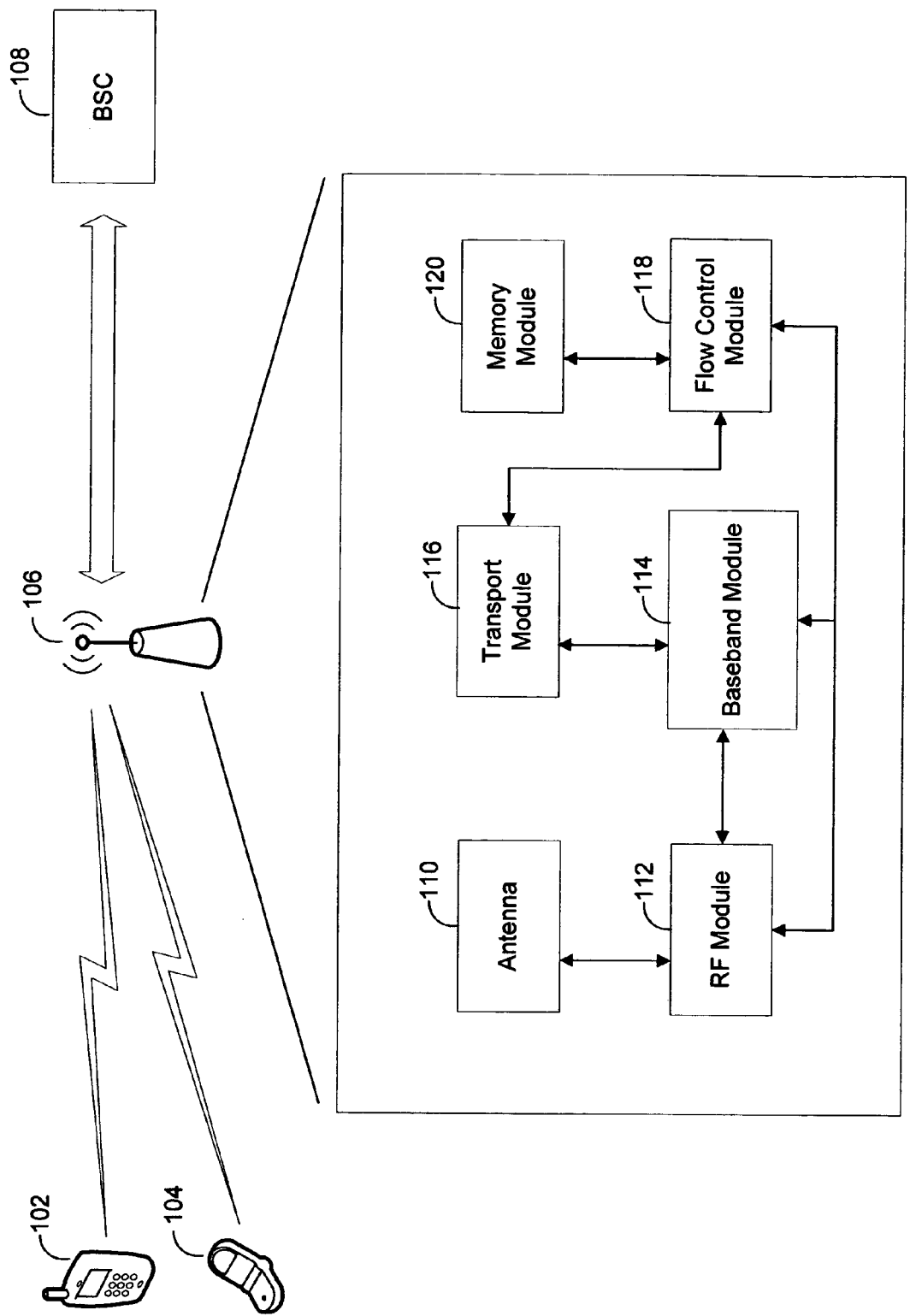
FIG. 1 illustrates a base station in communication with a base station controller and two subscriber stations to prioritize a flow in accordance with the present invention.

FIG. 1 illustrates one embodiment of a wireless system that includes a base station controller (BSC) (element 108) operated by a service provider in communication with one or more subscriber stations (SS) (elements 102 and 104) through a base station (element 106). The BSC (element 108) may be a controller for and be in communication with one or more base stations (element 106). Similarly, the base station (element 106) may be in communication with one or more SS (elements 102 and 104).

A subscriber station (element 104) is generally illustrative of various types of mobile wireless devices, such as cellular phones, personal digital assistants (PDAs), pocket PCs, handheld computer devices, etc. The base station (element 106) may comprise several elements to receive and transmit one or more flows from and to one or more subscriber stations. A flow may be a stream of data packets transferred real-time using a wireless system, such as a base station or a subscriber station, though the embodiment is not so limited. A data packet may be any block of data, either fixed or variable in size.

The flow may be received and transmitted by the base station (element 106) using an antenna (element 110), which may be coupled to a radio frequency (RF) module (element 112). The RF module (element 112) may include radio hardware to support wireless communications using radio signals and corresponding protocols defined by one or more wireless standards. For example, if the SS (element 104) comprises a cellular phone, the RF interface would include radio hardware to support cellular-based communications using an appropriate cellular standard such as a general packet radio system (GPRS), enhanced data rates for global evolution (EDGE), or third-generation wireless (3G), though the embodiment is not so limited. In other embodiments, other wireless communication standards may be employed, such as but not limited to communications defined by the Institute of Electrical Institute of Electrical and Electronic Engineers (IEEE) 802.11, Wireless Fidelity (Wi-Fi) and IEEE 802.16 Worldwide Interoperability for Microwave Access (WiMAX) suites of standards. The RF module (element 112) may comprise an amplifier, an analog to digital controller, a digital to analog controller, and one or more filters to convert radio signals and encoded data signals. The modules described herein can be hardware, software, firmware or any combination thereof.

The RF module (element 112), may be coupled to a baseband module (element 114). The baseband module (element 114) may comprise encoding, decoding, modulation, and demodulation hardware. A transport module (element 116) may be coupled to the baseband module (element 114) to transfer the flow to a wired terrestrial network. A flow control agent (element 118) may be used to coordinate and schedule the flows through the base station (element 106) using software or firmware, but the embodiment is not so limited.

In one embodiment, the flow control agent (element 118) may be an application-specific integrated circuit (ASIC) that is specifically designed to prioritize and schedule the flows. In another embodiment, the flow control agent (element 118) may comprise a microprocessor, a microcontroller, or a digital signal processor, but the embodiment is not so limited. The flow control agent (element 118) may be coupled to a memory module (element 120). The memory module (element 120) may be a cache memory embedded on the same chip with the processor core, or alternatively, be a memory storage device such as a random access memory (RAM) or a non-volatile memory that is separate from the processing device.

Figure 2:
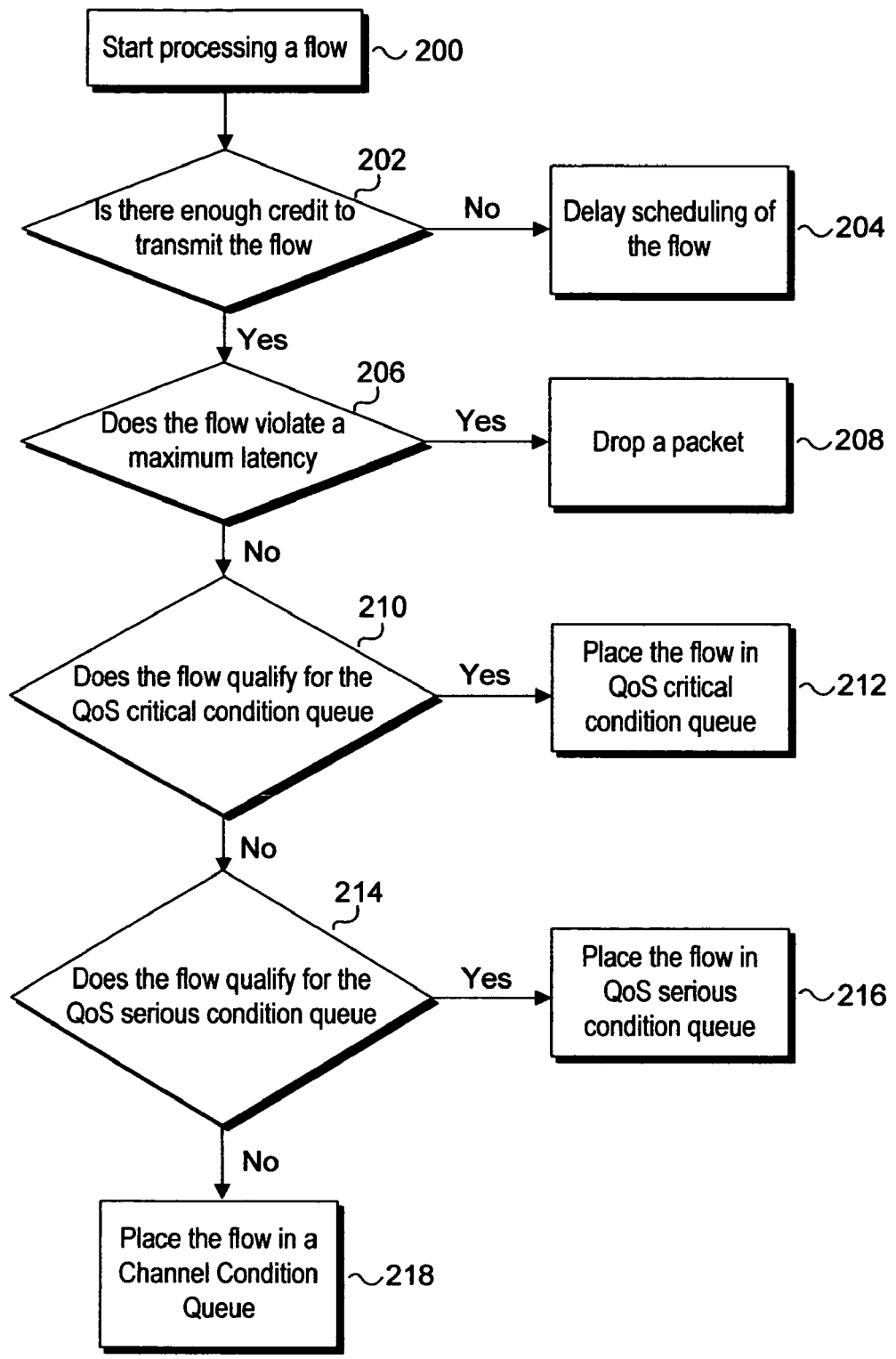
FIG. 2 is a flowchart describing one embodiment of a scheduling process used to prioritize flows using quality of service condition queues and channel condition queues.

One embodiment of a method to efficiently schedule a flow in a wireless system is described in FIG. 2. The process may be initiated by starting to process a flow 200 from a BSC (element 108) or from a SS (element 104) and determining whether there is enough credit to transmit the flow, as indicated in step 202. To determine whether there is enough of a credit to transmit the flow, a number of frames of data traffic that have elapsed but have not been granted to transmit the flow, is compared against a number of credit points needed to transmit the flow.

The credit of a flow may be incremented by one following the transmission of a frame. The credit of a flow is decremented by the number of credit points per service data unit (SDU) after a SDU is scheduled. The number of credit points per SDU may be expressed as the quotient of the size of a service data unit (SDU) and an amount of data quota that would be accumulated in a frame. The SDU is a data packet to be sent over the wireless system. In one embodiment, the SDU size for a voice over Internet Protocol (VoIP) flow may be 560 bits. The amount of data quota that is accumulated in a frame is the product of a data rate and the scheduling frame duration. For example, if the data rate is 28,000 bits per second and the scheduling frame duration is 5 ms per frame, the amount of data quota would be 140 bits per frame. The values used in this example were selected to illustrate the embodiment of the invention described in FIG. 2, but other values may be substituted. However, in this example if the SDU size is 560 bits and the amount of data quota is 140 bits per frame, the number of credit points would be 560/140=4. In this example, if the credit of a flow is less than four, then a scheduling of the flow would be delayed as indicated in step 204. Also in this example, if the credit of the flow is equal to or greater than four, then determine whether the flow violates a maximum latency as indicated in step 206.

The maximum latency is the maximum allowable time to hold and transfer a packet of data from one designated point to another, such as from a SS to a base station. The maximum latency may be negotiated between the base station and the SS upon an initialization of a connection based on a service type, such as a real-time service flow. In one embodiment, the real-time service flow may be VoIP, streaming audio, or streaming video. The scheduling frame duration represents a time that elapses between the beginning of a frame and the end of the frame. For example, if the maximum latency allowed is 100 milliseconds (ms) and the scheduling frame duration is 5 ms per frame, the maximum latency in frame units is 20 frames. The maximum latency in frame units represents the maximum allowable frames to hold and transfer a packet of data from a SS to a base station. If the credit is equal to or more than the maximum latency in frame units, then a packet, represented by a SDU, will be dropped 208. Otherwise, determine whether the flow qualifies for a quality of service (QoS) critical condition queue, as indicated by step 210.

To determine whether the flow qualifies for a QoS critical condition queue, the credit is compared against the maximum latency in frame units. If the maximum latency in frame units is one frame greater than the credit, then the flow may qualify for the QoS critical condition queue, as indicated in step 212. For example, if the credit is 19 and the maximum latency in frame units is 20, the difference is 1 and the flow may be placed in the QoS critical condition queue 212. If there are one or more flows already scheduled in the QoS critical condition queue, then the flows in the QoS critical condition queue may be transmitted on a first-in first-out (FIFO) basis. If the flow may not be placed in the QoS critical condition queue 212, determine whether the flow qualifies for a QoS serious condition queue, as indicated in step 214.

To determine whether the flow qualifies for a QoS serious condition queue 214, the scheduler compares the credit against the maximum latency in frame units. If the maximum latency in frame units is two greater than the credit, then the flow qualifies for the QoS serious condition queue, as indicated in step 216. For example, if the credit is 18 and the maximum latency in frame units is 20, the difference is 2 and the flow may be placed in the QoS serious condition queue 216. If there are one or more flows already scheduled in the QoS serious condition queue, then the flows in the QoS serious condition queue may be transmitted on a first-in first-out (FIFO) basis. If the flow may not be placed in the QoS serious condition queue 216, then place the flow in the channel condition queue.

The flow may be placed in the channel condition queue based on several factors. In one embodiment, if the flow is being uploaded by a WiMAX SS, there may be ten uplink interval usage code (UIUC) queues available for the flow. If the flow is being downloaded by a WiMAX SS, there may be thirteen downlink interval usage code (DIUC) queues available for the flow. If a channel condition of a wireless connection between a SS and a base station is good, then a scheduling priority may be higher than a channel condition between a SS and a base station that is bad. The channel condition between a SS and a base station is dependent on characteristics of the wireless connection, such as signal strength and signal to noise ratio, though the embodiment is not so limited. If the wireless connection has a strong signal strength and a high signal to noise ratio, the channel condition between the SS and the base station may be good. If the wireless connection has a weak signal strength and a low signal to noise ration, the channel condition between the SS and the base station may be bad. The UIUC queues may be assigned based on the channel condition. If there are one or more flows already scheduled in a UIUC queue, then the flows may be transmitted from the UIUC queue on a first-in first-out (FIFO) basis. Similarly, if there are one or more flows already scheduled in a DIUC queue, then the flows may be transmitted from the DIUC queue on a first-in first-out (FIFO) basis.

Figure 3:
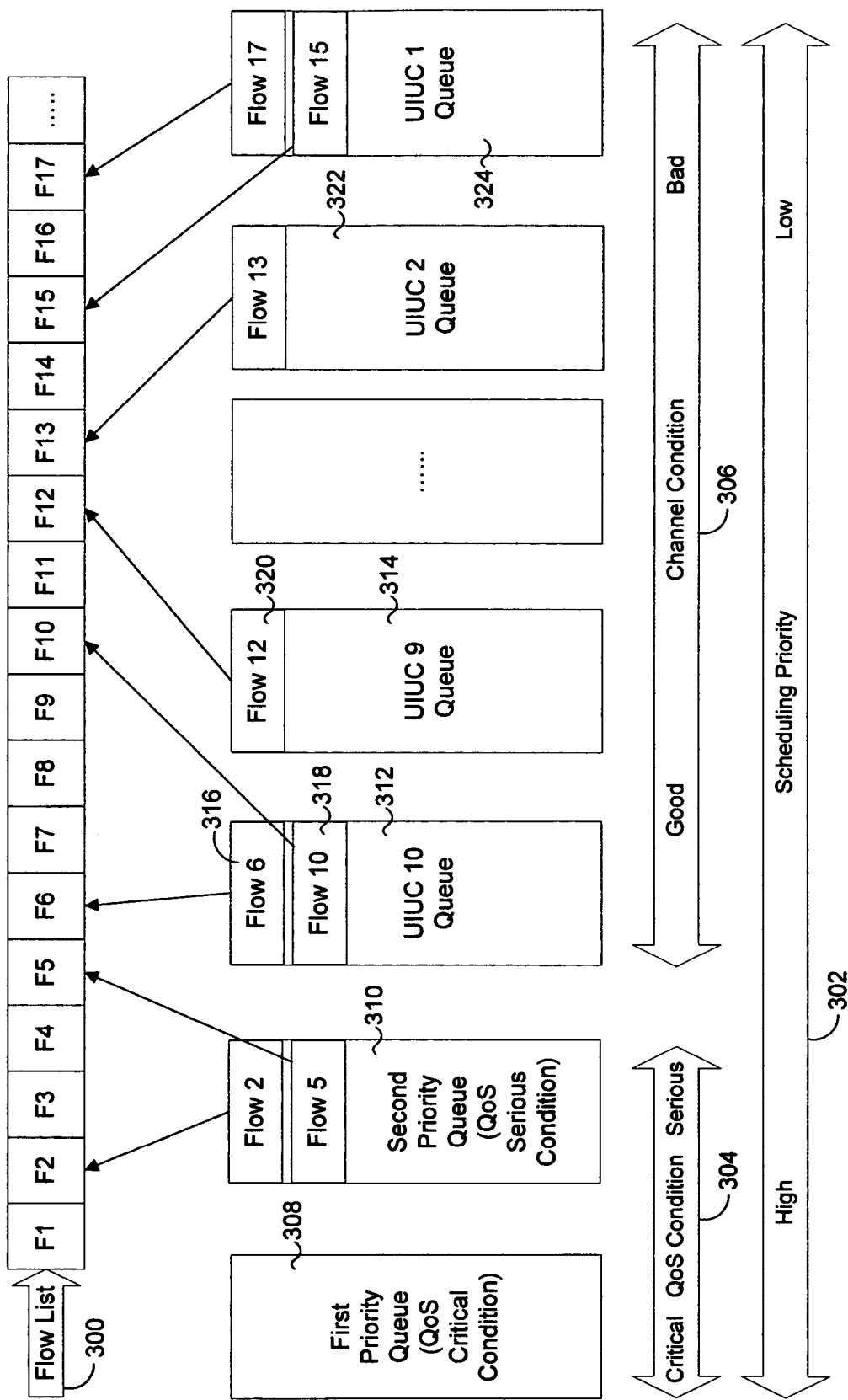
FIG. 3 illustrates scheduling of a list of flows using quality of service condition queues and channel condition queues.

FIG. 3 illustrates flows to be scheduled, represented by a flow list (element 300), using quality of service (QoS) condition queues (element 304) and channel condition queues (element 306). An incoming flow is evaluated, and placed in a QoS condition queue if it qualifies for a QoS condition, a channel condition queue if it qualifies for a channel condition queue, or is deferred for scheduling if it has not accumulated enough credit. The QoS condition queues (element 304) and the channel condition queues (element 306) are associated with scheduling priorities, ranging from high priority to low priority (element 302).

In one embodiment, one or more flows are assigned to a QoS Condition Queue (element 304). The QoS Condition Queues (element 304) may be comprised of a First Priority Queue (element 308) and a Second Priority Queue (element 310).

Also, there may be one or more Channel Condition Queues, each of which has an Uplink Interval Usage Code (UIUC) or a Downlink Interval Usage Code (DIUC) number associated with it. In one embodiment, each UIUC and DIUC is associated with a number of bytes a physical slot can hold. For example, a physical slot of good channel condition may hold more bytes of data than that of a bad channel condition.

In the embodiment shown in FIG. 3, UIUC 10 Queue (element 312) represents the best Channel Condition (element 306) and may comprise zero, one or more flows such as a Flow 6 (element 316) and a Flow 10 (element 318). UIUC 9 Queue (element 314) represents a second best Channel Condition (element 306) and may comprise zero, one or more flows such as Flow 12 (element 320). Further, UIUC 2 Queue (element 322) and UIUC 1 Queue (element 324) have bad Channel Conditions (element 306). Queues of good channel conditions have high scheduling priorities, and queues of bad channel conditions have low scheduling priorities.

After evaluating and putting flows in queues, the scheduler starts scheduling flows. Flows are scheduled according to high priority to lower priority queues, the highest priority queue first, then the second highest priority queue, etc. Scheduling for a frame is done when either all the flows in the queues are scheduled or scheduler runs out of scheduling resources.

In the embodiment shown in FIG. 3, queue priorities run from high to low and from left to right (element 302). The flows may be transmitted by the antenna (element 110) from a base station (element 106) to a SS (element 104), or received by the antenna (element 110) by a base station (element 106) from a SS (element 104) in the order provided by the scheduler. The embodiments discussed earlier focus on the uplink scheduling using the concept of credit and UIUC. The embodiments also apply to downlink scheduling if UIUC is replaced by DIUC, and credit is calculated from one or more real packets accumulated on a base station.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

Thus, embodiments of this invention may be used as or to support a software program executed upon some form of processing core (such as a processor of a computer) or otherwise implemented or realized upon or within a machine-readable medium. A machine-readable medium includes any mechanism for storing information in a form readable by a machine (e.g., a computer). For example, a machine-readable medium can include such as a read only memory (ROM); a random access memory (RAM); a magnetic disk storage media; an optical storage media; and a flash memory device, etc.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computer implemented method of prioritizing a flow in a wireless network, comprising:
   determining if the flow qualifies for either a quality of service critical condition queue or a quality of service serious condition queue by comparing a credit of the flow against a maximum latency allowed;
   when the flow qualifies for either the quality of service critical condition queue or the quality of service serious condition queue, placing the flow in the quality of service critical condition queue or the quality of service serious condition queue, respectively; and
   when the flow does not qualify for either the quality of service critical condition queue or the quality of service serious condition queue, placing the flow in one of a number of channel condition queues, wherein the channel condition queue comprises one or more uplink interval usage code queues or comprises one or more downlink interval usage code queues, wherein each of said number of channel condition queues has a unique channel condition associated with it, wherein said channel conditions associated with said channel condition queues are used to determine which channel condition queue to place the flow into.

2. The method of claim 1, wherein the credit of the flow is evaluated and a scheduling of the flow is delayed if the credit is insufficient.

3. The method of claim 1, wherein a maximum latency of the flow is evaluated and a data packet is dropped if the flow violates the maximum latency.

4. The method of claim 1, wherein quality of service critical condition queue or the quality of service serious condition queue may comprise zero, one or more flows.

5. The method of claim 1, wherein each uplink interval usage code queue may comprise zero, one or more flows.

6. The method of claim 1, wherein each downlink interval usage code queue may comprise zero, one or more flows.

7. The method of claim 1, wherein the quality of service critical condition queue or the quality of service serious condition queue may be disabled based on a loading of a scheduler.

8. A base station for scheduling of flows in a wireless network comprising:
   an antenna;
   a memory module; and
   a flow control agent coupled to the memory module for executing a set of instructions stored in the memory module, the set of instructions for:
      determining if a flow qualifies for either a quality of service (QoS) critical condition queue or a QoS serious condition queue by comparing a credit of the flow against a maximum latency allowed;
      when the flow qualifies for either the QoS critical condition queue or the QoS serious condition queue, placing the flow in the QoS critical condition queue or the QoS serious condition queue, respectively;
      when the flow does not qualify for either the QoS critical condition queue or the QoS serious condition queue, placing the flow in one of a number of channel condition queues, wherein the channel condition queue comprises one or more uplink interval usage code queues or comprises one or more downlink interval usage code queues, wherein each of said number of channel condition queues has a unique channel condition associated with it, wherein said channel conditions associated with said channel condition queues are used to determine which channel condition queue to place the flow into.

9. The base station of claim 8, wherein the memory module comprises a cache memory.

10. The base station of claim 8, wherein the flow control agent is a microprocessor, a microcontroller, or a digital signal processor.

11. An article comprising a non-transitory machine readable storage medium having stored thereon instructions that, when executed by a computing platform, result in:
   determining if a flow qualifies for either a quality of service (QoS) critical condition queue or a QoS serious condition queue by comparing a credit of the flow against a maximum latency allowed;
   when the flow qualifies for either the QoS critical condition queue or the QoS serious condition queue, placing the flow in the QoS critical condition queue or the QoS serious condition queue, respectively;
   when the flow does not qualify for either the QoS critical condition queue or the QoS serious condition queue, placing the flow in one of a number of channel condition queues, wherein the channel condition queue comprises one or more uplink interval usage code queues or comprises one or more downlink interval usage code queues, wherein each of said number of channel condition queues has a unique channel condition associated with it, wherein said channel conditions associated with said channel condition queues are used to determine which channel condition queue to place the flow into.

12. The article of claim 11, wherein the credit of the flow is evaluated and a scheduling of the flow is delayed if the credit is insufficient.

13. The article of claim 11, wherein a maximum latency of the flow is evaluated and a data packet is dropped if the flow violates the maximum latency.

14. The article of claim 11, wherein quality of service critical condition queue or the quality of service serious condition queue may comprise zero, one or more flows.

15. The article of claim 11, wherein each uplink interval usage code queue may comprise zero, one or more flows.

16. The article of claim 11, wherein the quality of service critical condition queue or the quality of service serious condition queue may be disabled based on a loading of a scheduler.

* * * * *